United States Patent [19]

Johnson et al.

[11] 4,121,196
[45] Oct. 17, 1978

[54] DATA BASE UPDATE SCHEME

[75] Inventors: Richard N. Johnson; Marvin J. Schneider, both of Adelphi, Md.

[73] Assignee: The United States of America as represented by the Secretary of the Army, Washington, D.C.

[21] Appl. No.: 792,832

[22] Filed: May 2, 1977

[51] Int. Cl.$^2$ .................. G02B 5/00; G03B 21/14; G06K 9/00
[52] U.S. Cl. .................. 340/146.3 P; 340/146.3 MA; 350/162 ZP; 353/35; 353/97; 358/22; 364/900
[58] Field of Search .................. 340/324 R, 146.3 F, 340/146.3 MA, 146.3 R, 146.3 P; 358/22, 165, 183; 350/3.5, 162 SF, 162 ZP; 353/35, 97; 364/200 MS File, 900 MS File

[56] References Cited

U.S. PATENT DOCUMENTS

| | | | |
|---|---|---|---|
| 3,264,611 | 8/1966 | Lohmann | 350/162 ZP |
| 3,336,681 | 8/1967 | Minasy | 353/35 |
| 3,534,396 | 10/1970 | Hart et al. | 364/200 |
| 3,644,019 | 2/1972 | Bestenreiner et al. | 353/97 |
| 3,749,822 | 7/1973 | van der Veer et al. | 358/22 |
| 3,772,465 | 11/1973 | Vlahos et al. | 358/22 |
| 3,975,094 | 8/1976 | Boggs | 353/35 |
| 4,031,519 | 6/1977 | Findley | 340/324 R |

Primary Examiner—Leo H. Boudreau
Attorney, Agent, or Firm—Nathan Edelberg; Robert P. Gibson; Saul Elbaum

[57] ABSTRACT

A method and apparatus for modifying data which is stored in a medium of archival quality. The original data is left unmodified, and a modification document is prepared which has addition and deletion data thereon. The original and modified data is combined in a given way to generate a correctly modified composite.

4 Claims, 6 Drawing Figures

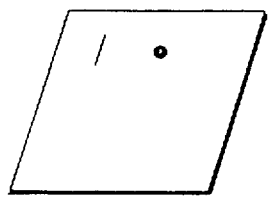
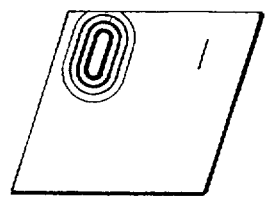
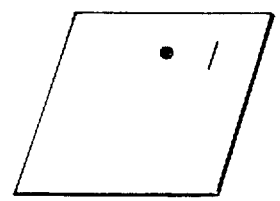
FIG. 1A  FIG. 1B  FIG. 1C
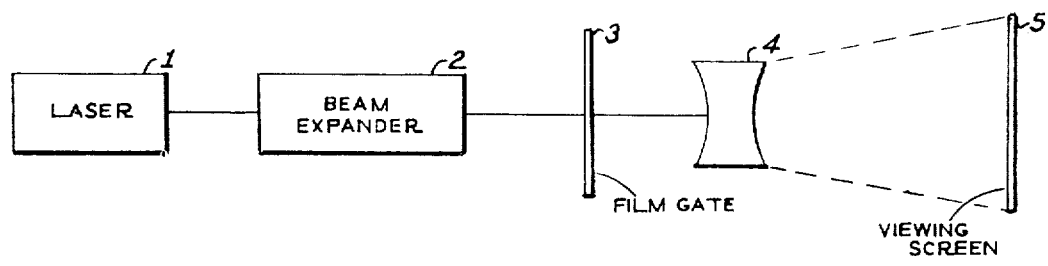
FIG. 2
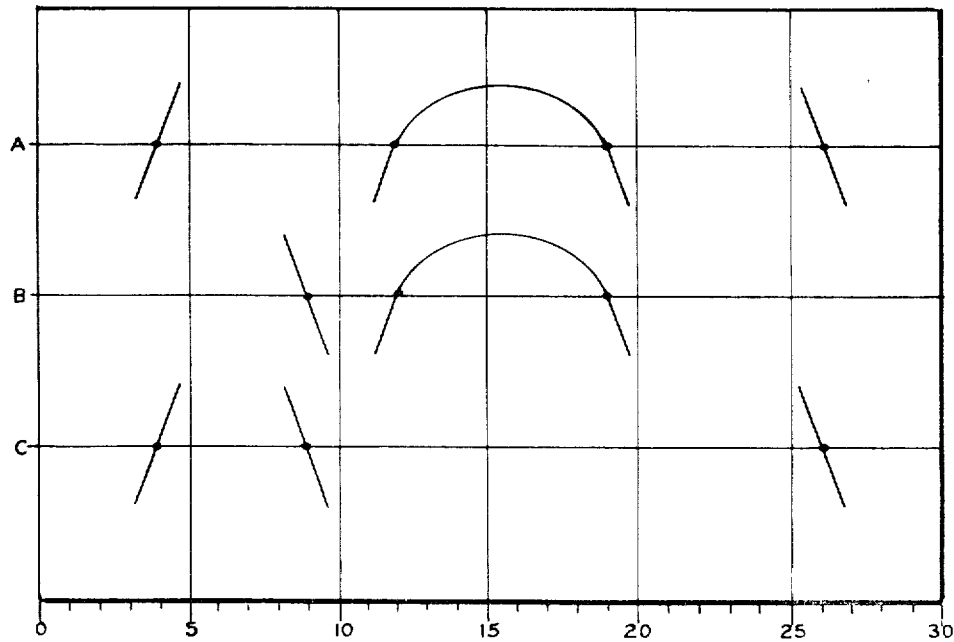
FIG. 3

DATA BASE UPDATE SCHEME

The present invention is directed to a method and apparatus for modifying data which is stored in any medium of archival quality. An archival quality medium is defined as one that is extremely difficult to modify, such as for instance, a microfilm picture, or data bits which are stored in a memory in accordance with a compaction algorithm.

The problem is best illustrated by reference to the simple case of the microfilm picture. If the picture is of an engineering drawing, when the engineering drawing is modified, the picture must be replaced wih a new microfilm picture of the modified drawing. Often, the original drawing is no longer available when the modification is desired, so a print of the original microfilm is made, this is modified, then a new microfilm picture of the modified print is made. As can be appreciated, this is a somewhat time-consuming procedure.

In accordance with the present invention, when the archival medium data is to be modified, the original data is left unaltered, and data comprising the desired modifications is added in a special way so that the retrieval of the data automatically presents a composite of the original data and the modifications including all additions and deletions.

It is therefore an object of the present invention to provide a method and apparatus for more effectively modifying data which is stored in an archival quality medium.

The invention will be better understood by referring to the drawings in which:

FIG. 1A is an illustration of an original microfilm picture.

FIG. 1B is an illustration of a modification picture.

FIG. 1C is an illustration of a picture having the composite image of both the original picture and modification picture thereon.

FIG. 2 is a diagram of an optical system which could be used for generating the image shown in FIG. 1.

FIG. 3 is a graphical illustration which depicts how information stored in a memory in accordance with a run length encoding algorithm may be modified in accordance with the invention.

Figure 4:
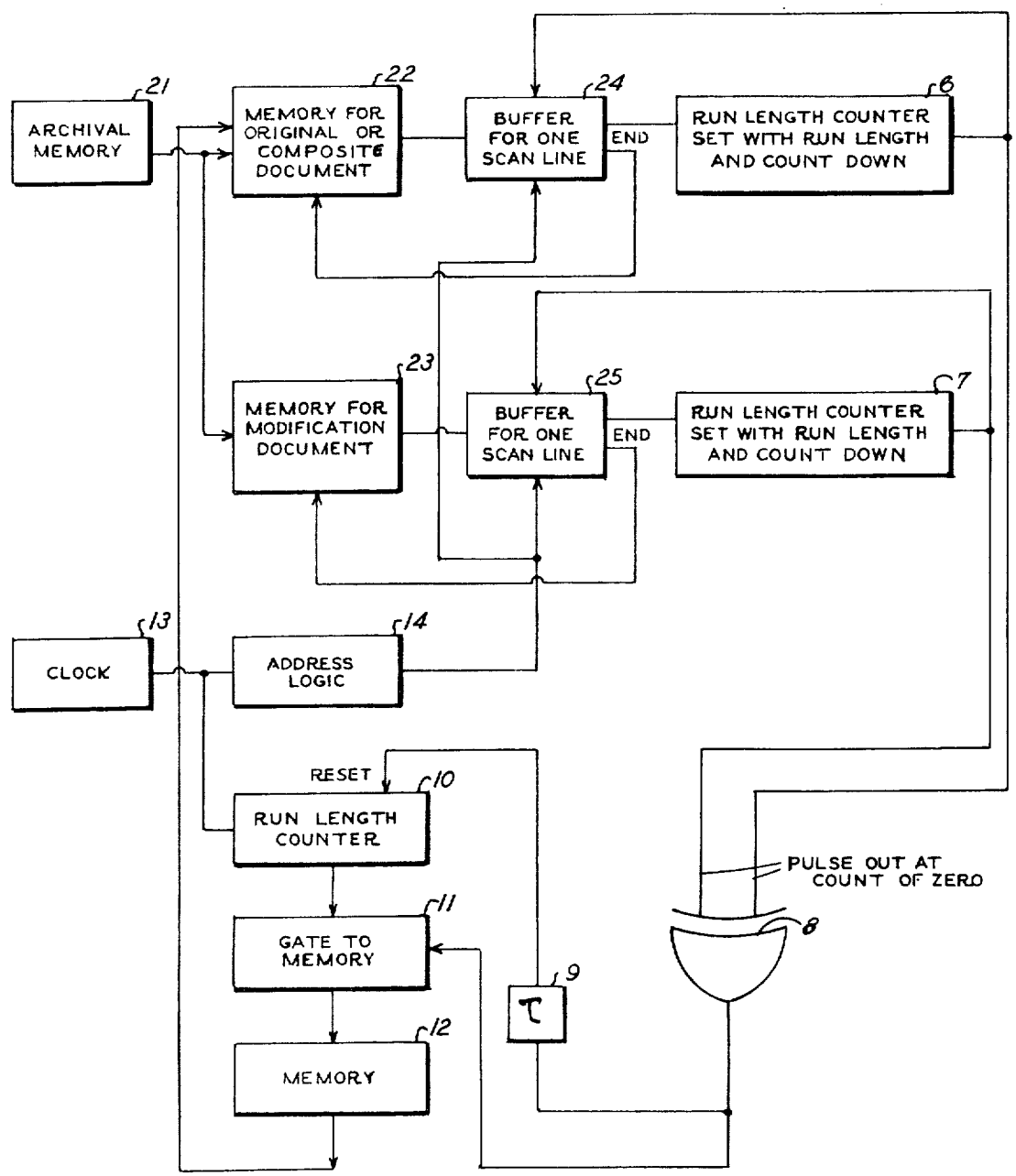
FIG. 4 is a block diagram of electronic apparatus for effecting the modifications illustrated in FIG. 3.

Referring to the figures, FIG. 1A shows a microfilm frame having data thereon in the form of images. Naturally, the data may be more complex than shown, and in a typical application of the invention, the data might be an engineering drawing.

As indicated above, if changes are made to the drawings, effecting corresponding changes to the microfilm, according to presently practiced methods, may involve a plurality of steps including making a print, making the modification, and re-exposing the microfilm.

In accordance with the present invention, a modification microfilm frame is prepared which has only the data to be added and deleted thereon. The added data is present in the form of images, similar to the data on the original frame, and a Fresnel zone plate is provided everywhere that a deletion is desired. When the two frames are placed in a viewer or projection system in overlay configuration, a correct modified picture is seen, including all additions and deletions. the additions are merely added by the additional images on the modification frame, and the Fresnel zone plates take light from everywhere else in the scene and focus it where deletions are desired, to effect the deletions. Another way of stating this is that the zone plates generate a hologram of black paper with white light on it wherever an image is to be deleted.

Referring to FIG. 1A, an original microfilm frame is shown, having a line near the left side and a circle near the center thereof. In FIG. 1B the modification frame is shown, having a zone plate positioned for focussing light on the line, and an additional line near the right side. In FIG. 1C, the composite image is shown, which image has the circle near the center and the line near the right side thereon.

In FIG. 2, an exemplary optical system for producing the composite image of FIG. 1 is shown. Because of the use of a zone plate, laser light is utilized in the system. The output of laser 1 is made incident on beam expander 2, which as known to those skilled in the art, provides an expanded, rectangular, collimated light pattern, which is used to irradiate film gate 3, which holds the two microfilm frames. The light which exits from the film is incident on optics 4, which projects the composite image on viewing screen 5.

As another example of an archival medium which can be modified in accordance with the teachings of the invention, scanned and digitized pictures may be stored digitally in a non-erasable medium, such as a memory. However, a system such as this will not be economically feasible unless the picture data is "compacted", that is, unless some compaction algorithm has been applied to the scanner output, so that a scan with a P x P point resolution capability requires much less than $P^2$ bits of storage.

Currently, documents that are stored in this manner must be de-compacted, a hard copy of the original reproduced, this copy modified, then a freshly scanned and compacted record made to replace the original record. Here, as before, all the unmodified data of the original must be replicated, which is a very inefficient use of the storage medium. Since digital summation of stored data is readily accomplished, the problem in this case becomes one of minimizing the record size of any given modification, thus economizing on storage medium.

This aspect of the invention will be illustrated with respect to the simplest compaction algorithm, run length encoding, which records only the number of scan elements between changes in picture intensity. Storage is effected on a scan line-by-line basis and thus on playback, the display is set bright, or dark, and a counter is loaded with the run length. The display spot scans, and as each resolution element of the display is passed, the counter is decremented by one count. When the counter reaches zero, the display is changed from dark to bright or vice versa, the counter is loaded with the next run length, and the display proceeds as before until the end of a scan line is reached. At the beginning of the next scan line, new initial (bright or dark) conditions are set, and the new line is scanned as before.

The method provided by the invention for storing modifications is to scan a modification document which contains everything to be added to the original, plus an exact copy of every feature of the original that is to be deleted. To generate a display of the modified document, identically numbered scan lines in the two compacted data sets are combined in a special way, which will be described below.

In FIG. 3, along line A there is a picture of an exemplary drawing (picture A) which might be stored in a memory according to the run length encoding technique described above. As indicated, information for each scan line would be stored in the memory, and thus for the scan line shown, according to the compaction algorithm, only the numbers 4, 8, 7 and 7 would be stored, the first number indicating the position of a bright (or dark) spot, and each subsequent number indicating the number which must be added to the preceeding number to arrive at the position of the next spot. Obviously, if the same information is stored for each scan line, then the entire picture is defined. The exact way in which such information would be stored in a memory is known to those skilled in the art.

In FIG. 3 along line B there is a picture of a modification document (picture B) which could be used to modify picture A. For the case given, it is desired to modify picture A by adding the first slanted line in picture B (having a negative slope), and by deleting the arc of picture A. This result is illustrated in the picture along line C (picture C).

According to the invention, data representative of the modification document shown in FIG. 3B is also stored in memory. According to the compaction algorithm being illustrated, the information stored for the scan line shown would be 9, 3 and 7. The outputs of the respective memories are then combined as follows. The initial run lengths of the two data sets, 4 and 9, are compared, and the lesser value 4 is loaded into the counter, which causes a spot to be scanned when it counts down to zero, at the position 4 in FIG. 3. The loaded value is also subtracted from the corresponding value in the other data set, that is, 4 is subtracted from 9, giving 5, and the value 5 is compared with the next value in the original data set, 8. The lesser value 5 is loaded into the counter and a spot is made at 4 + 5 = 9. The loaded value is also subtracted from the next value in the other data set, that is, 5 is subtracted from 8 giving 3, which is compared with the next value in the other data set which is 3. When both values are the same it means that that spot is to be deleted and should not appear in the output. We then compare the next numbers in both data sets, which are both 7's, also identical, so we move 10 positions without making a spot. We then have only a 7 left in the original data set and so we load a 7 into the counter and make a spot at position 26 in FIG. 3.

The above process may be summarized as follows:

1. Initial run lengths in the two data sets are compared; the shorter is loaded into the run length counter and also subtracted from the larger value in the alternate data set to produce a "second value" of run length for this data set.

2. At the conclusion of the initial run length, the second run length of the controlling data set is compared with the "second value" of run length in the alternate data set; once again the smaller value is used and also subtracted from the larger for subsequent comparisons.

3. In the event that a comparison of run lengths reveals "identical" values, this common value is saved, and both data sets are queried for their next run lengths. The smaller of these is selected, added to the saved common value for use in the run length counter, and, as before, subtracted from the alternate run length.

4. "Identical" as used above may be taken to mean that the values are within one least significant bit, or some other practical limit imposed by timing inaccuracies in the scanner.

FIG. 4 is a block diagram of electronic apparatus which could be used to carry out the technique described above. Referring to FIG. 4, memory 22 is the memory for the original document or for a composite document which is to be further combined with a modification document utilizing the apparatus illustrated. Memory 23 is the memory for the modification document. The data stored in memories 22 and 23 is fed to buffers 24 and 25 on a line-by-line basis. Thus, buffers 24 and 25 store data for one scan line. After the data has been read out of buffers 24 and 25, a signal is generated on the END output line which is fed back to memories 22 and 23, respectively, to supply the buffers with the data for the next scan line.

Clock 13 drives address logic 14 for reading the data out of buffers 24 and 25 into run length counters 6 and 7, respectively. Run length counters 6 and 7 are thus set with run length values and then counted down to zero. In the example discussed above, counters 6 and 7 would initially be respectively loaded with the numbers 4 and 9. When one of the counters counts down to zero, a pulse is emitted on its output line. The output lines of the counter are inputted to exclusive OR gate 8, which, as known to those skilled in the art, generates an output signal when the inputs thereto are different, but does not generate an output signal when the inputs thereto are the same. Hence, in the example given, when counter 6 counts down to zero, counter 7 will still have 5 left, and exclusive OR gate 8 will therefore generate an output pulse.

Clock 13 also drives run length counter 10 which will have counted up to 4 when run length counter 6 counts down to zero. At count 4, the output of exclusive OR gate 8 gates run length counter 10 through gate 11 to memory 12, where a bit or bits corresponding to the number 4 are stored. After a delay provided by network 9, run length counter 10 is reset to zero.

Further, whenever either of the counters 6 or 7 counts down to zero, a signal is fed back to the respective buffer 24 or 25 to input the next number to the counter which is to be counted down. In the example given, after counter 6 counts down to zero, the next number, which is 8, is loaded into counter 6. Counter 7 is the next counter to count down to zero, which occurs in five more counts, and the corresponding number is recorded in memory 12. The next number, which is 3, is then inputted into counter 7, and next counters 6 and 7 count down to zero at the same time. Thus, at count 12, exclusive OR gate 8 has no output, and a point of the arc in FIG. 3 is effectively deleted in memory 12. The apparatus of FIG. 4 continues to operate in the above-described manner. In subsequent summations, the newly-generated composite memory may be used as the original for summation with other modification documents. The archival memory 21 is the overall system controller which selects the appropriate memories to be combined with each other in any given case.

Clearly, for any computer automated design and drafting system whose data base is arranged so that drawings are stored as sequential lists, (of lines, circles, arcs of circles, alphanumeric, etc.), the modification list can be generated and used as follows: the original document list is used to generate the document display on the computer automated system. The drawing modification features of the computer automated system are then used in the usual fashion to create the new, modified drawing. This will result in a new document sequential list which, when compared to the original list, will have certain items deleted where an erasure was made in the original drawing, and will also have additional items listed beyond the end of the original list. Now a comparison is made of the two sequential lists, beginning at the top of both. Wherever two items are identical, they are discarded, and we proceed to the next item on both lists. Wherever two items differ, the item in the original document list is copied into the modification list and the next item on the original document list is accessed for comparison with the unchanged item in the new document list. This continues until items are found that are identical in the two lists whereat nothing is stored and we proceed to the next item on both lists as before, until we reach the end of the original document list, whereat all subsequent items on the new document list are copied into the modification list. The modification list is now stored into the archival memory.

To produce a composite drawing list, we start at the top of both the original document list and the modification list and compare the items. If no match is found, we store the item from the original document into the composite document list and access the next item on the original document list for comparison with the unchanged first item on the modification list. This proceeds until we find a match, whereat we discard the identical items from both lists and proceed to the next time on both lists, comparing as before, until we reach the end of the original document list, whereat we copy all remaining items from the modification list into the composite list. The composite list now can be used to generate the new drawing, or can be used in place of the original document list in a repetition of the above procedure to further modify the drawing in accordance with an additional modification list.

Schemes according to the invention will have a certain impact on whatever data base it is used in. The chief impact is the need for recording, in association with each document, the fact that an updating document has been added. Since the recording of this information may be done no sooner than the updating document is recorded, the simplest arrangement would be reservation of a space in every document record for placing the address of its modifying document record. Each modifying document record will have a space reserved for placing the address of the (chronologically) next modification to be added. The information that this arrangement offers the user considerably exceeds the usual system wherein the original document is directly modified, because, unlike the usual system which does not make a real attempt to delineate each change to the original via a verbal description of the change, this arrangement provides a precise description of the original unchanged document and a precise enumeration of every change to be made in that document, all in chronological order.

The word "document" as used in the following claims is intended to include any medium in which data can be stored or recorded, including film and memories.

We wish it to be understood that we do not desire to be limited to the exact detail of construction shown and described, for obvious modifications can be made by a person skilled in the art.

We claim:

1. An apparatus for modifying the contents of a storage memory which stores original picture information which is encoded in the memory in accordance with the run length encoding compaction algorithm, said picture information being delineated by picture line in said memory, for each picture line said stored information comprising a group of numbers which locate the relative positions of picture elements along the line, comprising, a modification memory having picture modification information stored therein in accordance with the run length encoding compaction algorithm, said modification information being delineated by picture lines in said memory which correspond to said picture lines in said storage memory, said modification information for each line comprising a group of numbers which locate the relative positions along that line at which picture elements are to be either added or deleted to said original picture information, means for extracting the information from the respective memories on a line by line basis, means responsive to said information extracted for modifying the group of numbers stored in said storage memory for each line by 1) adding numbers which are indicative of positions along that line at which the numbers in said storage memory do not locate a picture element but the numbers in said modification means do locate a picture element, and, 2) deleting numbers which are indicative of positions at which both the numbers in said storage memory and the numbers in said modification memory locate picture elements.

2. The apparatus of claim 1 wherein said means for modifying includes a pair of counter means and exclusive OR gate means.

3. An apparatus for modifying the image which is projected when light is passed through a first film having a first image stored thereon, said modifying including both adding and deleting image material, comprising, a second film having a second image stored thereon to be added to said first image and having Fresnel zone plates stored thereon for deleting material from said first image, said Fresnel zone plates being disposed on said second film at locations corresponding to the locations of the image material on said first film which is to be deleted, means for holding said first and second films in overlay configuration so that said zone plates overlay said image material on said first film to be deleted, and means for transmitting light through said films, whereby said modified image is projected.

4. The apparatus of claim 3 wherein said means for transmitting light through said film includes laser means.

* * * * *